(12) United States Patent
Zhong

(10) Patent No.: US 10,757,327 B2
(45) Date of Patent: Aug. 25, 2020

(54) PANORAMIC SEA VIEW MONITORING METHOD AND DEVICE, SERVER AND SYSTEM

(71) Applicant: SHENZHEN INTELLIFUSION TECHNOLOGIES CO., LTD., Shenzhen (CN)

(72) Inventor: Bin Zhong, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/626,522

(22) PCT Filed: Dec. 25, 2017

(86) PCT No.: PCT/CN2017/118240
§ 371 (c)(1),
(2) Date: Dec. 25, 2019

(87) PCT Pub. No.: WO2019/033673
PCT Pub. Date: Feb. 21, 2019

(65) Prior Publication Data
US 2020/0120275 A1    Apr. 16, 2020

(30) Foreign Application Priority Data

Aug. 15, 2017  (CN) .......................... 2017 1 0698793

(51) Int. Cl.
*H04N 5/00* (2011.01)
*G06T 7/80* (2017.01)
(Continued)

(52) U.S. Cl.
CPC ....... *H04N 5/23238* (2013.01); *G06T 3/4038* (2013.01); *G06T 7/50* (2017.01);
(Continued)

(58) Field of Classification Search
CPC .............................. H04N 5/23238; G06T 7/80
(Continued)

(56) References Cited

U.S. PATENT DOCUMENTS

2007/0097206 A1   5/2007  Houvener et al.
2019/0158813 A1*  5/2019  Rowell ................ H04N 13/239

FOREIGN PATENT DOCUMENTS

CN    104902236 A    9/2015
CN    105959665 A    9/2016
(Continued)

OTHER PUBLICATIONS

International Search Report Issue, in corresponding international application No. PCT/CN2017/118240, dated May 4, 2018.
(Continued)

*Primary Examiner* — Jeffery A Williams

(57) ABSTRACT

The embodiments of the present invention provide a panoramic sea view monitoring method, said method including: aligning any two adjacent monitoring cameras among a plurality of monitoring cameras, so that the any two adjacent monitoring cameras are located on the same physical horizontal plane in a field of view; obtaining monitoring images by using the plurality of aligned monitoring cameras and a depth-of-field camera to monitor a panoramic sea view; determining a horizontal spacing parameter and a vertical spacing parameter of the any two adjacent monitoring cameras; and using the horizontal spacing parameter and the vertical spacing parameter to combine the monitoring images in a pairwise manner, so as to construct a two-dimensional scene. The present invention also provides a panoramic sea view monitoring device, a server and a system. The present invention can reduce the complexity of the system while reducing the cost.

6 Claims, 9 Drawing Sheets

(51) Int. Cl.
*H04N 5/232* (2006.01)
*G06T 7/50* (2017.01)
*G06T 7/70* (2017.01)
*H04N 13/156* (2018.01)
*G06T 3/40* (2006.01)
*H04N 5/247* (2006.01)
*H04N 7/18* (2006.01)

(52) U.S. Cl.
CPC .................. *G06T 7/70* (2017.01); *G06T 7/80* (2017.01); *H04N 5/247* (2013.01); *H04N 7/181* (2013.01); *H04N 13/156* (2018.05); *G06T 2207/10028* (2013.01); *G06T 2207/30244* (2013.01)

(58) Field of Classification Search
USPC .......................................................... 348/38
See application file for complete search history.

(56) References Cited

FOREIGN PATENT DOCUMENTS

| CN | 106791621 A | 5/2017 |
|---|---|---|
| CN | 107370994 A | 11/2017 |

OTHER PUBLICATIONS

Written Opinion of the International Searching Authority for No. PCT/CN2017/118240.
Initial publication with International Search Report for No. WO 2019/033673 A1, dated Feb. 21, 2019.

* cited by examiner

Before alignment        After alignment

Before merging alignment　　　　After merging alignment

PANORAMIC SEA VIEW MONITORING METHOD AND DEVICE, SERVER AND SYSTEM

CROSS-REFERENCE TO RELATED APPLICATION

This application claims the benefit of priority from Chinese Patent Application No, 201710698793.2 entitled "PANORAMIC SEA VIEW MONITORING METHOD AND DEVICE, SERVER AND SYSTEM" and filed on Aug. 15, 2017, the content of which is hereby incorporated by reference in its entire by reference.

BACKGROUND

Technical Field

The present disclosure generally relates to maritime unmanned monitors field, and especially relates to a panoramic sea view monitoring method, a panoramic sea view monitoring device, a server and a system.

Description of Related Art

Vast waters in our country, is needed to carry out unmanned monitoring on it in order to ensure its safety. At present, there are a variety of methods to achieve unmanned monitoring on the vast waters, for example, a scheme based on a high definition image satellite, a scheme based on an aerostat and a high definition image system and a scheme based on an unmanned floating object or an unmanned vessel. However, complex systems and high cost of the above schemes are not conducive to full implementation.

SUMMARY

The technical problems to be solved: in view of the shortcomings of the related art, the present disclosure relates to a panoramic sea view monitoring method and a device, a server and a system which can reduce the complexity of the overall system, and simultaneously reduce the cost thereof.

The technical solution adopted for solving technical problems of the present disclosure is:

a panoramic sea view monitoring method includes:

aligning any two adjacent monitoring cameras among a plurality of monitoring cameras, so that the any two adjacent monitoring cameras are located on the same physical horizontal plane in a field of view;

monitoring a panoramic sea view by using the plurality of aligned monitoring cameras and a depth-of-field camera, so as to obtain monitoring images;

determining a horizontal spacing parameter and a vertical spacing parameter of the any two adjacent monitoring cameras; and merging the monitoring images in a pairwise manner by using the horizontal spacing parameter and the vertical spacing parameter, so as to construct a two-dimensional scene.

In an alternative embodiment, the method also includes:

for each monitoring camera, determining a distance between each point to be calibrated of the monitoring camera and the monitoring camera, and determining an angle formed between each point to be calibrated and the monitoring camera and the depth-of-field camera, wherein each monitoring camera includes a plurality of points to be calibrated; and determining a distance and angle calibration curve of the monitoring camera according to the distance and the angle.

In an alternative embodiment, the method also includes:

for each target monitoring object and any one monitoring camera in the panoramic sea view, determining an angle formed between the target monitoring object and the any one monitoring camera and the depth-of-field camera;

determining a distance between the target monitoring object and the any one monitoring camera; according to the angle formed between the target motoring object and the any one monitoring camera and the depth-of-field camera, and a distance and angle calibration curve of the any one monitoring camera; and constructing a three-dimensional scene on the any one monitoring camera by combing the distance between all target monitoring objects and the any one monitoring camera, and attribute information of all the target monitoring objects pre-recorded, based on a two-dimensional scene of the any one monitoring camera.

In an alternative embodiment, the method also includes:

for the any one monitoring camera, mapping the three-dimensional scene constructed on the any one monitoring camera into a uniform three-dimensional coordinate system by coordinate transformation; and merging all the target monitoring objects in the three-dimensional coordinate system, so as to construct a world scene on the plurality of monitoring cameras.

In an alternative embodiment, the step of determining an angle formed between the target monitoring object and the any one monitoring camera and the depth-of-field camera, includes:

acquiring a first angle between a current depth-of-field camera and a horizontal line;

acquiring a second angle between the any one monitoring camera and the horizontal line;

determining a deflection angle needed by images of the target monitoring object under a physical deflection angle of the depth-of-field camera; and determining an angle formed between the target monitoring object and the any one monitoring camera and the depth-of-field camera according to the first angle, the second angle and the deflection angle.

A panoramic sea view monitoring device includes:

an aligning unit configured to align any two adjacent monitoring cameras among a plurality of monitoring cameras, so that the any two adjacent monitoring cameras are located on the same physical horizontal plane in a field of view;

a monitoring unit configured to monitor a panoramic sea view by using the plurality of aligned monitoring cameras and a depth-of-field camera, so as to obtain monitoring images;

a determining unit configured to determine a horizontal spacing parameter and a vertical spacing parameter of the any two adjacent monitoring cameras; and a constructing unit configured to merge the monitoring images in a pairwise manner by using the horizontal spacing parameter and the vertical spacing parameter, so as to construct a two-dimensional scene.

A server includes a memory configured to store at least one instruction therein, and a processor configured to perform computer programs stored in the memory to implement the panoramic sea view monitoring method above mentioned.

A computer readable storage medium is configured to store at least one instruction which is performed by a processor to implement the panoramic sea view monitoring method above mentioned.

A panoramic sea view monitoring system includes a plurality of monitoring cameras, a depth-of-field camera and a server, the monitoring camera configured to monitor a panoramic sea view in a two-dimensional space; the depth-of-field camera configured to collect distance information associated with target monitoring objects in a three-dimensional space based on monitoring by the plurality of monitoring cameras in the two-dimensional space; and the server configured to implement the panoramic sea view monitoring method above mentioned.

Based on the above technical scheme, the panoramic sea area monitoring method of the present disclosure is applied to a server included in the panoramic sea area monitoring system. The panoramic sea area monitoring system also includes a plurality of monitoring cameras and a depth-of-field camera. The server is configured to align any two adjacent monitoring cameras among the plurality of monitoring cameras, so that the any two adjacent monitoring cameras are located on the same physical horizontal plane in a field of view; furthermore, the server is configured to monitor a panoramic sea view by using the plurality of aligned monitoring cameras and a depth-of-field camera, so as to obtain monitoring images; and determine a horizontal spacing parameter and a vertical spacing parameter of the any two adjacent monitoring cameras; and furthermore, the server is then configured to merge the monitoring images in a pairwise manner by using the horizontal spacing parameter and the vertical spacing parameter, so as to construct a two-dimensional scene. It can be seen that, in the present disclosure, the panoramic sea view monitoring system only needs one depth-of-field camera, which can be combined with the monitoring camera to monitor the panoramic sea view, which can reduce the complexity of the system and reduce the cost thereof. In addition, the two-dimensional scene can be constructed to monitor the panoramic sea view in a more intuitive way.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In order to make the above purposes, features and advantages of the present disclosure more obvious and thorough understand of the subject matter presented herein, the following is a further detailed description of the present disclosure in combination with the accompanying drawings and the specific implementation embodiments.

Figure 1:
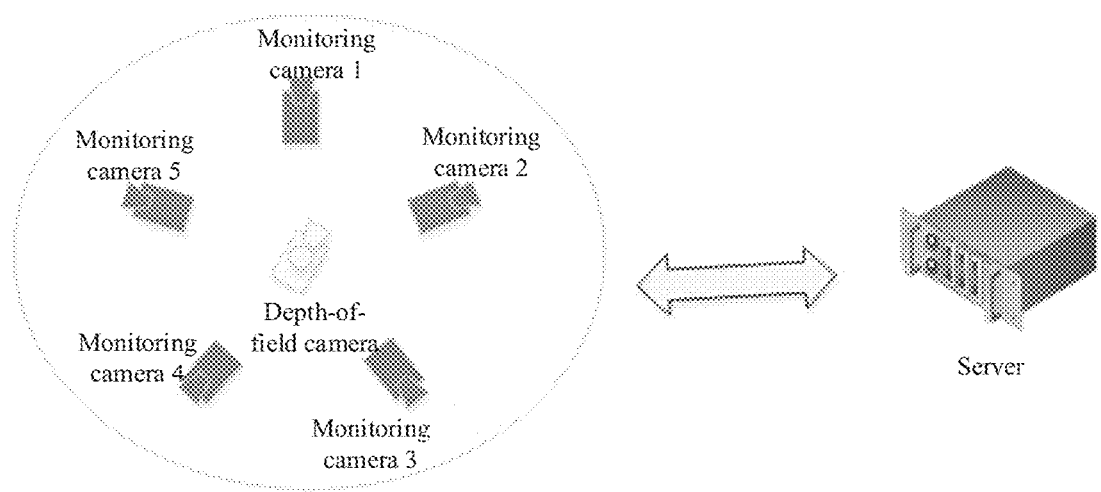
FIG. 1 is an architectural view of a panoramic sea view monitoring system in accordance with an embodiment disclosed in the present disclosure.

Referring to FIG. 1, it is an architectural view of a panoramic sea view monitoring system in accordance with an embodiment disclosed in the present disclosure. As shown in FIG. 1, the panoramic sea view monitoring system includes a plurality of monitoring cameras (such as monitoring camera 1, monitoring camera 2, monitoring camera 3, monitoring camera 4 and monitoring camera 5), a depth-of-field camera and a server. It should be noted that the number of the monitoring cameras shown in FIG. 1 is only an example, and it can also include more or less monitoring cameras than that shown in FIG. 1, while, the panoramic sea view monitoring system of the present disclosure can only need to be equipped with one depth-of-field camera.

Furthermore, the monitoring camera can be a camera with a certain monitoring range in a horizontal direction, such as a wide-angle monitoring camera. At least three monitoring cameras is provided in the panoramic sea view monitoring system of the present disclosure, and for their arrangement, all monitoring cameras are centered around a virtual circle and radially distributed at a preset angle at intervals, and a monitoring range of any two adjacent monitoring cameras is overlapped and covered at a certain angle, so that a 360-degree field of view can be formed after overlapping and merging the monitoring range of all monitoring cameras. In this way, the monitoring camera can monitor all target monitoring objects of the panoramic sea view in a two-dimensional space.

Furthermore, the depth-of-field camera can be any camera, such as a wide-angle camera, and for s arrangement, the depth-of-field camera needs to be positioned at the center of the above virtual circle, and it can rotate at a preset angular speed to complete scan with 360-degree per unit of time. The depth-of-field camera is configured to collect distance information associated with the target monitoring object in a three-dimensional space based on monitoring by the monitoring camera in the two-dimensional space.

Figure 2:
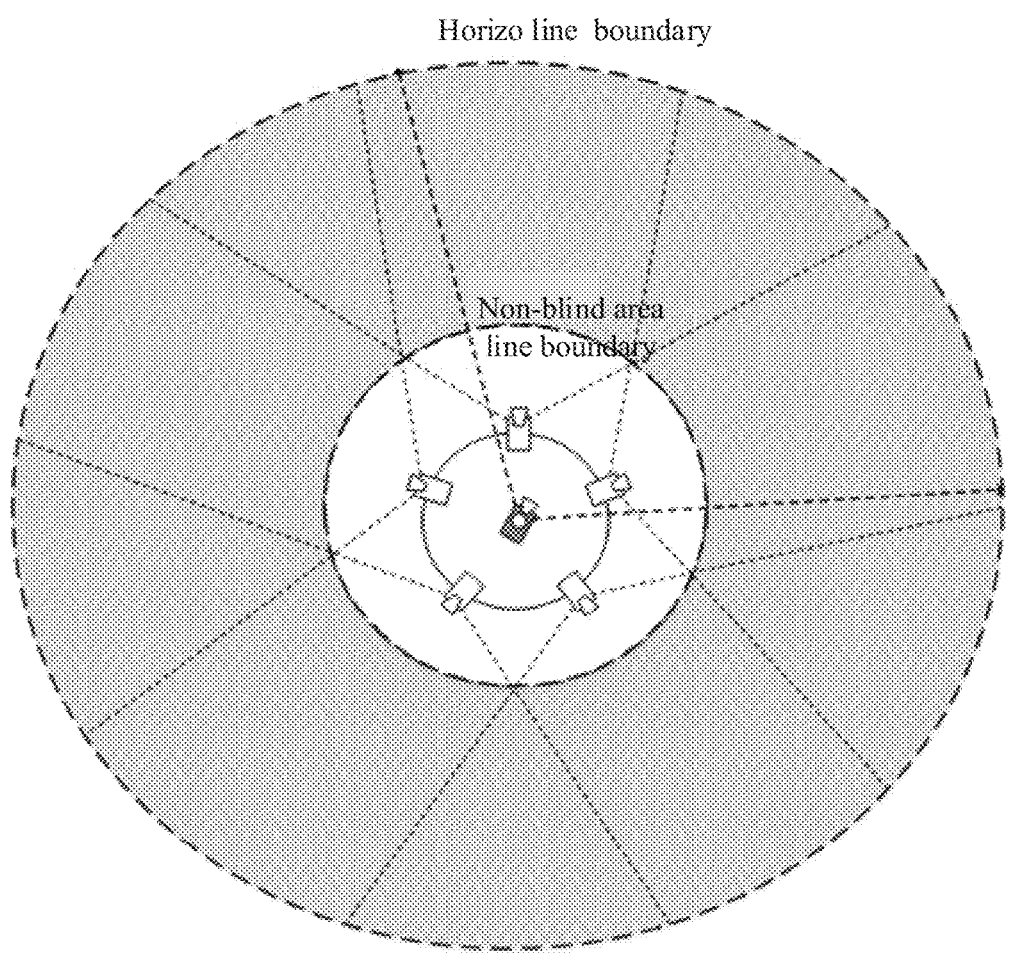
FIG. 2 is a top view of camera distributions of the panoramic sea view monitoring system disclosed in the present disclosure.

Referring to FIG. 2, it is a top view of camera distributions of the panoramic sea view monitoring system disclosed in the present disclosure. As shown in FIG. 2, the depth-of-field camera is positioned at the center of the virtual circle, all monitoring cameras (such as the monitoring camera 1, the monitoring camera 2, the monitoring camera 3, the monitoring camera 4 and the monitoring camera 5) are located on the circumference of the center of the virtual circle and radially distributed to each other. Beyond the circumference here all the monitoring cameras are, there is a non-blinded area line boundary, and beyond that there is a horizon line boundary. The monitoring camera can be configured to scan an area between the non-blinded area line boundary and the horizon line boundary at any angle to form a 360-degree field of view, while, there is a blind area between the non-blinded area line boundary and the center of the virtual circle, that is, the monitoring camera can't scan the blind area therein.

Furthermore, the server can be a computer system that provides services to other devices (such as surveillance cameras or depth-of-field cameras) in network. If a personal computer can provide a File Transfer Protocol (FTP) service, it can also be called as a server. In a narrow sense, the server is specifically referred to some high-performance computers that can provide services through the network, so that its stability, security, performance and other aspects are required higher than ordinary personal computers, therefore, its CPUs, chipsets, memories, disk systems, networks and other hardware all are different from the ordinary personal computer.

In the panoramic sea view monitoring system as shown in FIG. 1, the server is configured to align any two adjacent monitoring cameras among the plurality of monitoring cameras, so that the any two adjacent monitoring cameras are located on the same physical horizontal plane in a field of view; furthermore, the server is configured to monitor a panoramic sea view by using the plurality of aligned monitoring cameras and a depth-of-field camera, so as to obtain monitoring images; and determine a horizontal spacing parameter and a vertical spacing parameter of the any two adjacent monitoring cameras; and furthermore, the server is then configured to merge the monitoring images in a pair-wise manner by using the horizontal spacing parameter and the vertical spacing parameter, so as to construct a two-dimensional scene. It can be seen that, in the present disclosure, the panoramic sea view monitoring system only needs one depth-of-field camera, which can be combined with the monitoring camera to monitor the panoramic sea view, which can reduce the complexity of the system and reduce the cost thereof. In addition, the two-dimensional scene can be constructed to monitor the panoramic sea view in a more intuitive way.

Figure 3:
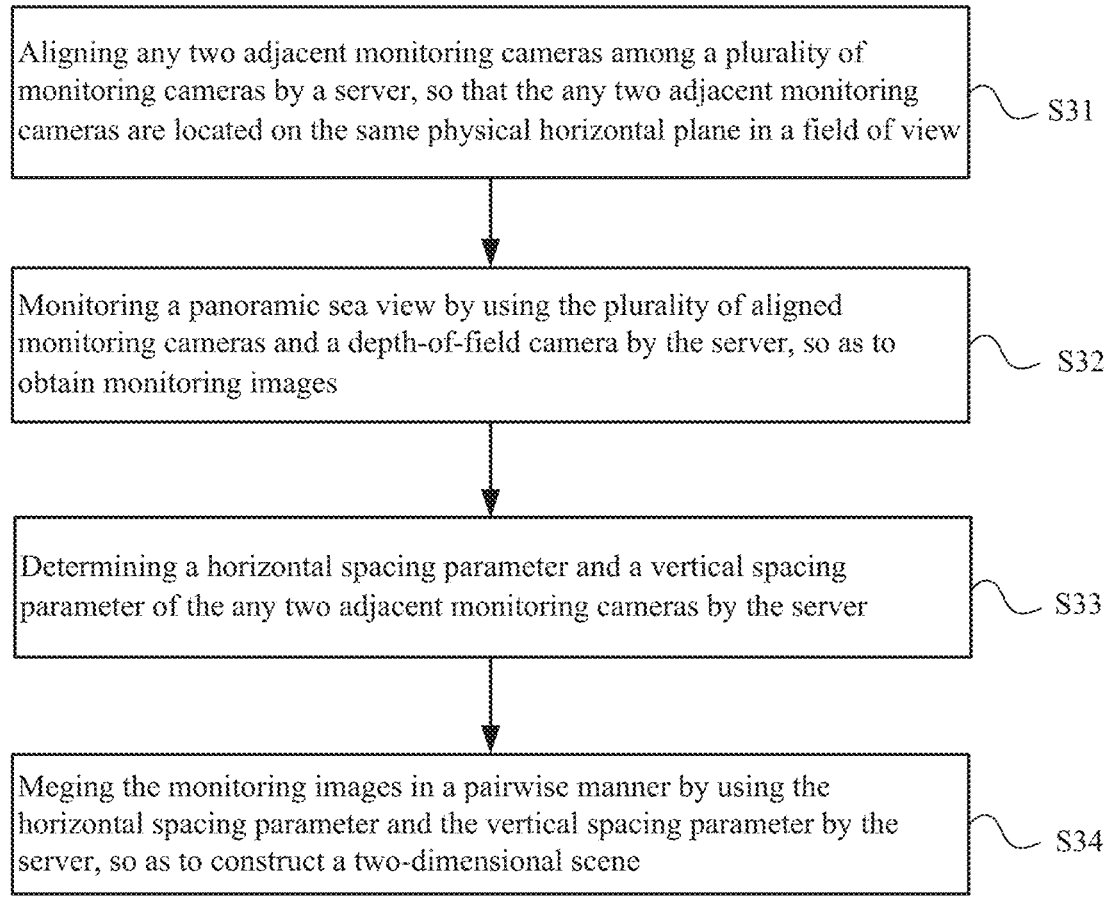
FIG. 3 is a flowchart of a panoramic sea view monitoring method in accordance with an embodiment disclosed in the present disclosure.

Referring to FIG. 3, it is a flowchart of the panoramic sea view monitoring method in accordance with an embodiment disclosed in the present disclosure. According to different requirements, the sequence of steps in the flowchart of FIG. 3 can be changed and some steps can be omitted.

S31, aligning any two adjacent monitoring cameras among the plurality of monitoring cameras by the server, so that the any two adjacent monitoring cameras are located on the same physical horizontal plane in a field of view.

In the present disclosure, the field of view of the any two adjacent monitoring cameras among the plurality of monitoring cameras is overlapped in a certain angle, it is necessary to align the any two adjacent monitoring cameras among the plurality of monitoring cameras in advance in order to obtain parameters for constructing the two-dimensional scene subsequently.

Specifically, a ruler can be used for horizontal physical alignment to determine whether the any two adjacent monitoring cameras are located on the same physical horizontal plane in the field of view. Moreover, the function of horizontal physical alignment is to improve width of effective areas in the two-dimensional scene reconstructed subsequently.

Figure 4:
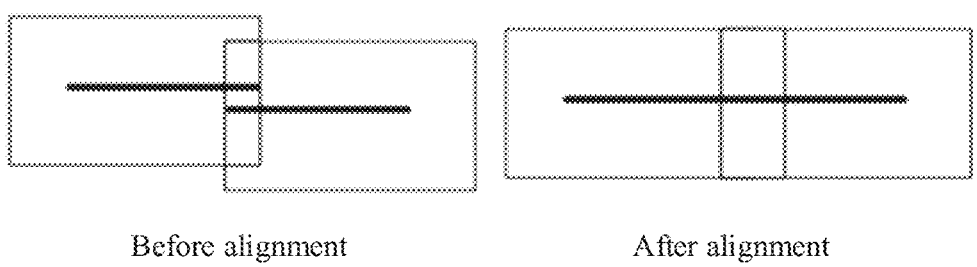
FIG. 4 is a schematic view before and after horizontal physical alignment by using a ruler disclosed in the present disclosure.

Referring to FIG. 4, it is a schematic view before and after horizontal physical alignment by using a ruler disclosed in the present disclosure. As shown in FIG. 4, a gap is existed in their field of view of the any two adjacent monitoring cameras before the horizontal physical alignment, while, after the horizontal physical alignment, their respective field of view of the any two adjacent monitoring cameras is basically located on the same physical horizontal plane in the field of view.

In the present disclosure, because the horizontal physical alignment can't ensure that the any two adjacent monitoring cameras can be aligned precisely, in order to improve the accuracy of alignment, it can optionally carry out image automatic mosaic and alignment processing to achieve full alignment of the image after horizontal physical alignment. A specific method is shown as follows: a picture is placed between the any two adjacent monitoring cameras, one frame image is taken from the any two adjacent monitoring cameras respectively, and then data frame is merged and processed, so as to realize the image automatic mosaic and alignment processing.

In the present disclosure, after the horizontal physical alignment and the image automatic mosaic and alignment processing of all the any two adjacent monitoring cameras, the any two adjacent monitoring cameras are located on the same physical horizontal plane in the field of view.

Figure 5:
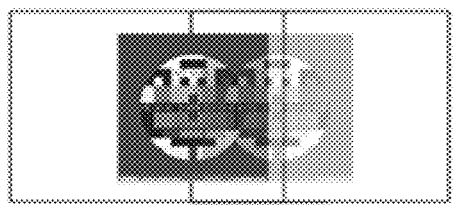
FIG. 5 is a schematic view of image automatic mosaic and alignment processing disclosed in the present disclosure.
Figure 5:
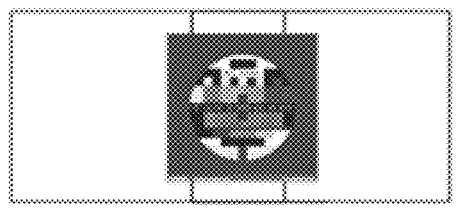

Referring to FIG. 5, it is a schematic view of image automatic mosaic and alignment processing disclosed in the present disclosure. As shown in FIG. 5, each frame image taken from the any two adjacent monitoring cameras respectively is separated to each other and partially overlapped therebetween before the image automatic mosaic and alignment processing, while, two frames of images obtained are completely overlapped so as to obtain complete image alignment after the image automatic mosaic and alignment processing.

S32, monitoring a panoramic sea view by using the plurality of aligned monitoring cameras and the depth-of-field camera by the server, so as to obtain monitoring images.

Figure 6:
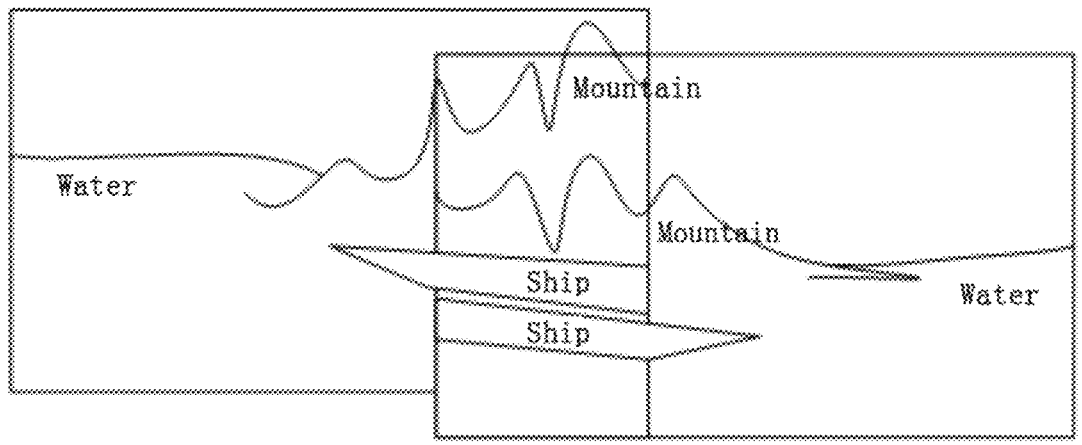
FIG. 6 is a schematic view of a monitoring image disclosed in the present disclosure.

Furthermore, the server can monitor the panoramic sea view by using monitoring algorithm to obtain the monitoring images. The monitoring algorithm can include, but not limited to, common canny algorithm, wavelet transform algorithm, optical flow algorithm, KCF algorithm and CNN algorithm etc. The server can obtain the monitoring images after monitoring the panoramic sea view. Referring to FIG. 6, it is a schematic view of a monitoring image disclosed in the present disclosure. FIG. 6 is shown a monitoring image monitored by the any two adjacent monitoring cameras, it can be seen from FIG. 6 that there are waters, mountains and ships in the monitoring images. Moreover, the images monitored by the any two adjacent monitoring cameras are overlapped each other.

S33, determining a horizontal spacing parameter and a vertical spacing parameter of the any two adjacent monitoring cameras by the server.

Figure 7:
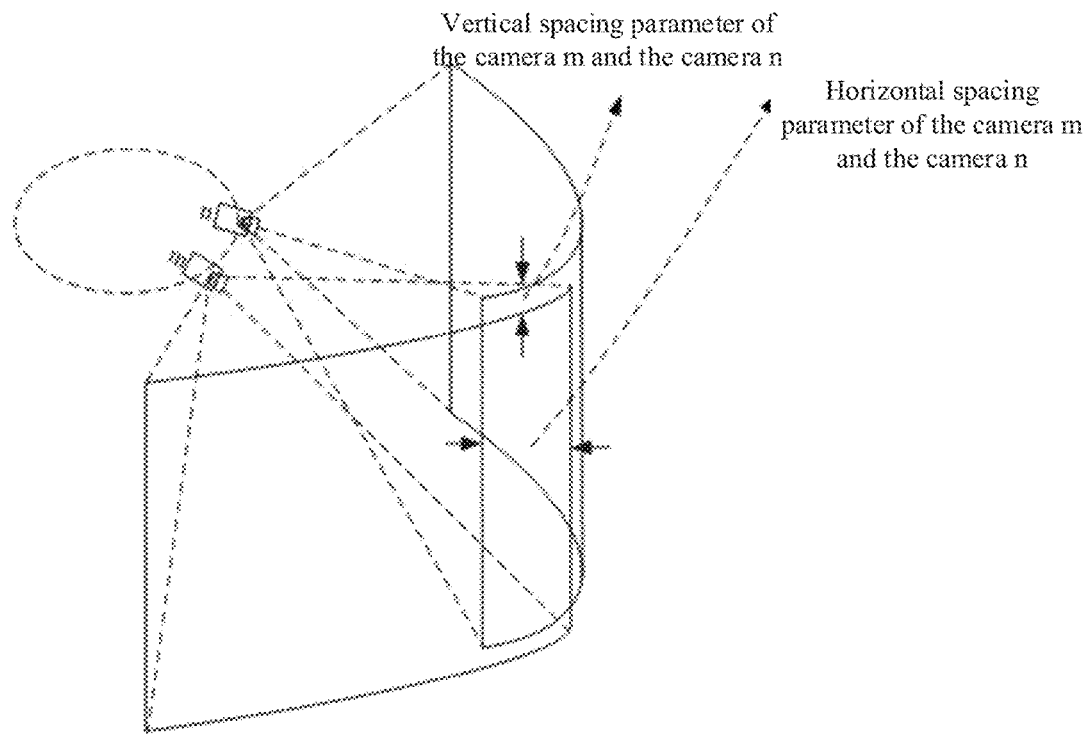
FIG. 7 is a schematic view of a horizontal spacing parameter and a vertical spacing parameter of the any two adjacent monitoring cameras disclosed the present disclosure.

In the present disclosure, during the alignment of the any two adjacent monitoring cameras, the server can determine the horizontal spacing parameter and the vertical spacing parameter of the any two adjacent monitoring cameras. Referring to FIG. 7, it is a schematic view of a horizontal spacing parameter and a vertical spacing parameter of the any two adjacent monitoring cameras disclosed in the present disclosure. As shown in FIG. 7, the any two adjacent monitoring cameras are respectively called as camera m and camera n, during the alignment of the camera m and the camera n, one spacing is formed between the camera m and the camera n in the horizontal direction (as shown in the arrow). At the same time, the other spacing is formed between the camera m and the camera n in the vertical direction (as shown in the arrow). The server can determine the horizontal spacing parameter and the vertical spacing parameter of the camera m and the camera n during the alignment of the camera m and the camera n.

S34, merging the monitoring images in a pairwise manner by using the horizontal spacing parameter and the vertical spacing parameter by the server, so as to construct a two-dimensional scene.

In the present disclosure, the server can be configured to obtain a plurality of monitoring images during monitoring the panoramic sea view. It is assumed that the any two adjacent monitoring cameras are the camera m and the camera n, respectively, the horizontal spacing parameter of the camera m and the camera n obtained by the server is $V(m, n)$, and so as the vertical spacing parameter is $H(m, n)$. An image to be merged is $F(m)$, $F(n)$ and its resolution is width*height, thereby a merging process is as follows:

1) since there are $V(m, n)$ and $H(m, n)$, a new blank image $F(m, n)$ can be created with its size $\{width*2-H(m, n)\}$, $\{height*2-V(m,n)\}$;

2) after operations such as image transformation and replication, the image $F(n)$ is converted to a first range of the blank image $F(m, n)$, and the first range is from $(0,0)$ to (width, height);

3) after operations such as image transformation and replication, the image $F(m)$ is converted to a second range of the blank image $F(m, n)$, and the second range is from $\{[width-H(m, n)], [height-V(m, n)]\}$ to $\{[width*2-H(m, n)], [height*2-V(m n)]\}$;

4) for pixels of overlapped areas, elements with same attributes can be merged directly. For example, elements with the attribute of a mountain can be merged, elements with the attribute of a coast can be merged, and with the attribute of a ship can be merged.

Figure 8:
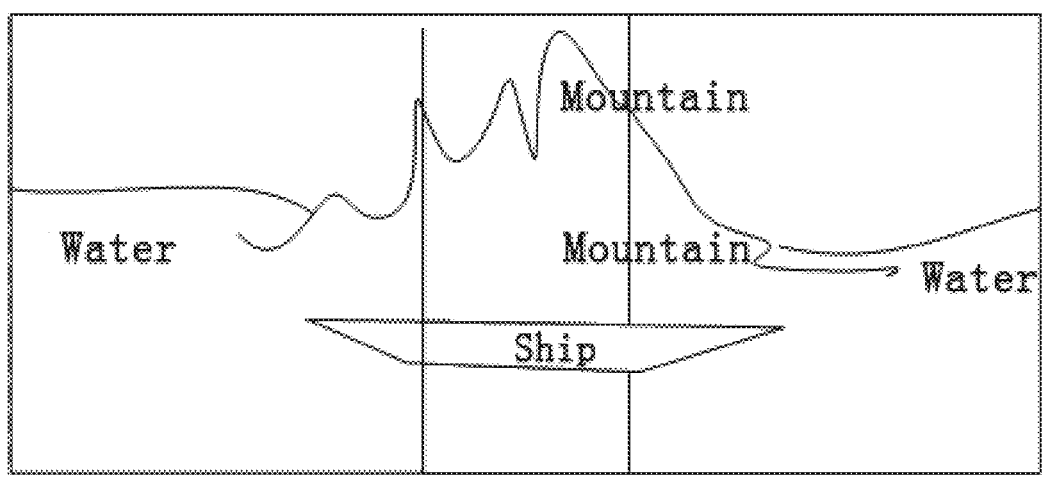
FIG. 8 is a schematic view of a two-dimensional panoramic disclosed in the present disclosure.

Continuously performing steps 1)-4) until all images are merged and finally a two-dimensional panorama is constructed. Referring to FIG. 8, it is a schematic view of a two-dimensional panoramic disclosed in the present disclosure. The two-dimensional panorama shown in FIG. 8 is formed by merging the images based on FIG. 6. It should be noted that the two-dimensional panorama shown in FIG. 8 is only the result of merging the images monitored by the any two adjacent monitoring cameras in a pairwise manner, rather than images monitored by all monitoring cameras.

As shown in FIG. 3, the panoramic sea view monitoring method only needs one depth-of-field camera combined with the monitoring camera to monitor the panoramic sea view which can reduce the complexity of the system and reduce the cost thereof. In addition, the two-dimensional scene can be constructed to monitor the panoramic sea view in a more intuitive way.

Figure 9:
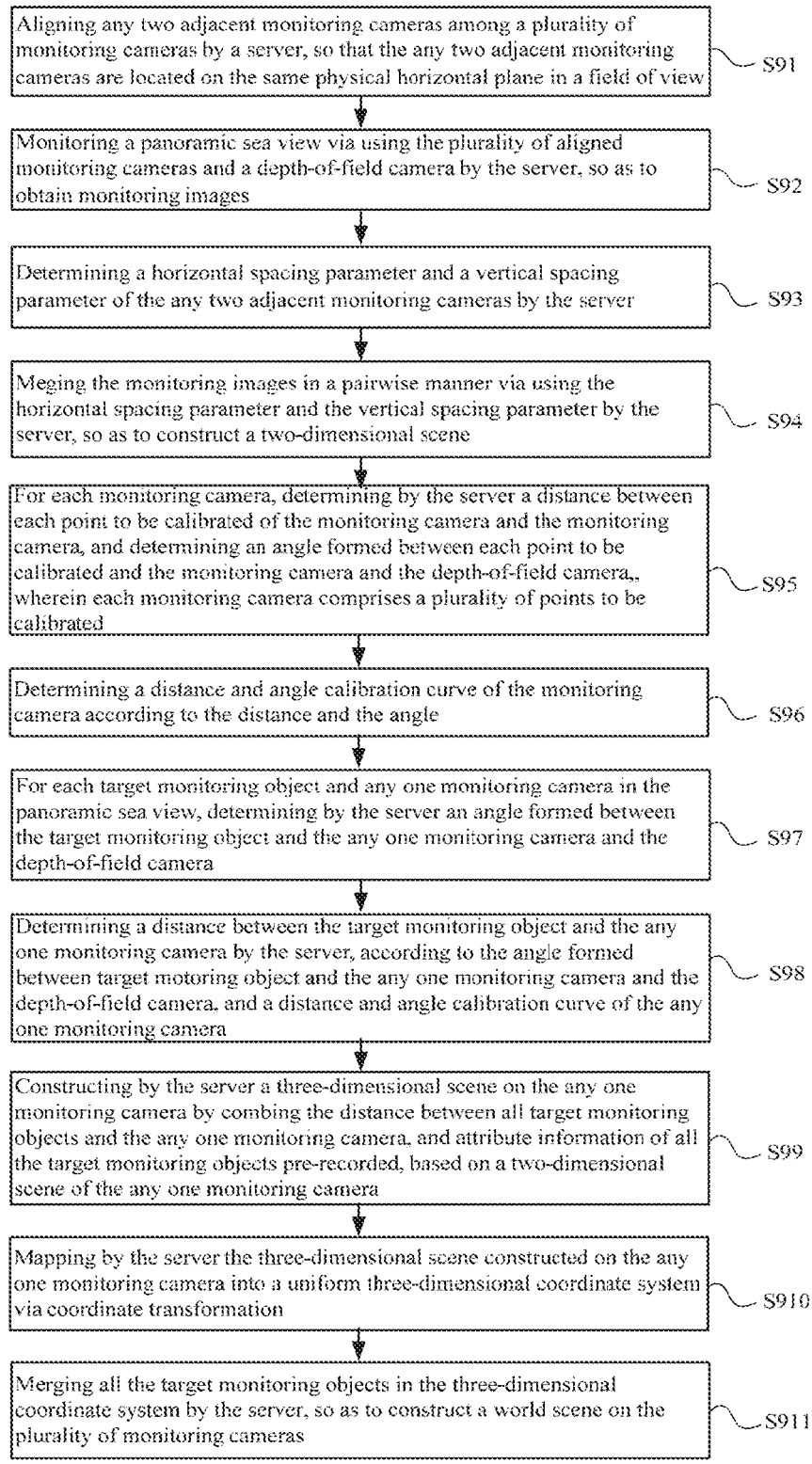
FIG. 9 is a flowchart of the panoramic sea view monitoring method in accordance with another embodiment disclosed in the present disclosure.

Referring to FIG. 9, it is a flowchart of the panoramic sea view monitoring method in accordance with another embodiment disclosed in the present disclosure. According to different requirements, the sequence of steps in the flowchart of FIG. 9 can be changed and some steps can be omitted.

S91, aligning any two adjacent monitoring cameras among the plurality of monitoring cameras by the server, so that the any two adjacent monitoring cameras are located on the same physical horizontal plane in a field of view.

S92, monitoring a panoramic sea view by using the plurality of aligned monitoring cameras and the depth-of-field camera by the server, so as to obtain monitoring images.

S93, determining a horizontal spacing parameter and a vertical spacing parameter of the any two adjacent monitoring cameras by the server.

S94, merging the monitoring images in a pairwise manner by using the horizontal spacing parameter and the vertical spacing parameter by the server, so as to construct a two-dimensional scene.

S95, for each monitoring camera, determining a distance between each point to be calibrated of the monitoring camera and the monitoring camera, and determining an angle formed between each point to be calibrated and the monitoring camera and the depth-of-field camera by the sever.

In the present disclosure, a pairwise calibration is needed to be performed by the server between the plurality of monitoring cameras and the depth-of-field camera. Specifically, one monitoring camera can be firstly selected, and then all points to be calibrated corresponding to the selected monitoring camera can be selected, finally, a distance between each point to be calibrated and the selected monitoring camera can be determined. For any one point to be calibrated of the selected monitoring camera, one frame image can be taken by the monitoring camera and the depth-of-field camera, respectively, in this way, the server can be configured to determine the angle formed between the any one point to be calibrated and the selected monitoring camera and the depth-of-field camera by integrating physical measurement results and an image mosaic algorithm. By repeating the above steps, different monitoring cameras can be calibrated and points to be calibrated can be selected until the angle formed between all the points to be calibrated corresponding to each monitoring camera and the monitoring camera and the depth-of-field camera is obtained.

Furthermore, the image mosaic algorithm is to seamlessly merge two or more images with partially overlapping areas so as to obtain images with high resolutions or wide-view angles. In the present disclosure, the image mosaic algorithm is provided to obtain accurate information of angle/ direction in order to improve accuracy for constructing the two-dimensional scene/three-dimensional scene subsequently.

Figure 10:
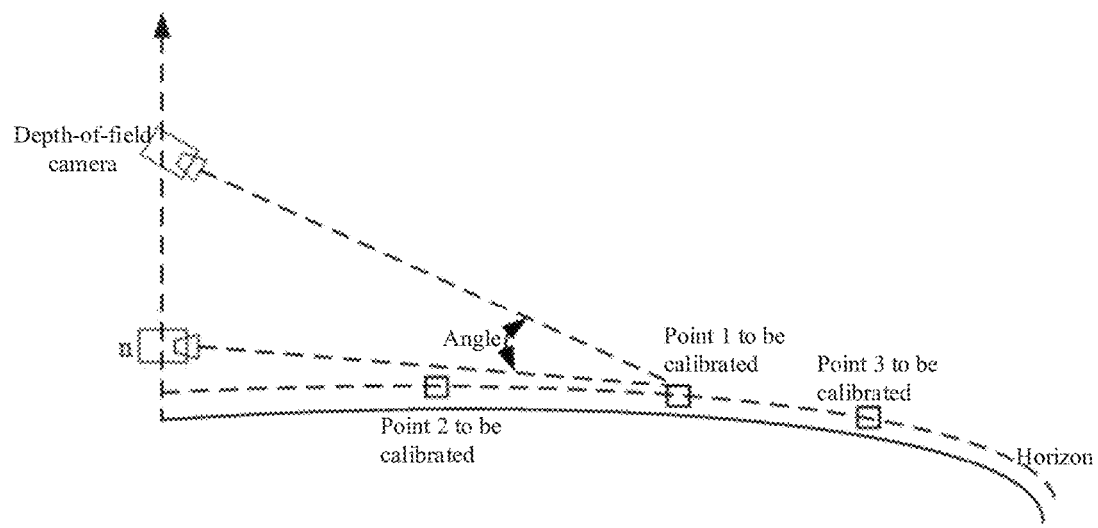
FIG. 10 is a schematic view of an angle formed between a point to be calibrated and the monitoring camera and the depth-of-field camera disclosed in the present disclosure.

Referring to FIG. 10, it is a schematic view of an angle formed between a point to be calibrated and the monitoring camera and the depth-of-field camera disclosed in the present disclosure. As shown in FIG. 10, the selected monitoring camera n is taken as an example, point 1 to be calibrated can be firstly selected. An angle shown in FIG. 10 is the angle formed between the point 1 to be calibrated, and the monitoring camera n and the depth-of-field camera. Similarly, point 2 to be calibrated and point 3 to be calibrated can also be selected.

It should be noted that each monitoring camera corresponds to a plurality of points to be calibrated, and position of each point to be calibrated is different for points to be calibrated of the same monitoring camera, however, for the plurality of monitoring cameras, the same point to be calibrated can be included in the plurality of monitoring cameras. For example, the monitoring camera A includes point 1 to be calibrated, point 2 to be calibrated, point 3 to be calibrated and point 4 to be calibrated, which are respectively at different positions, while, the monitoring camera B includes the point 1 to be calibrated, point 6 to be calibrated, point 7 to be calibrated and point 8 to be calibrated. In this way, the point 1 to be calibrated is included in the monitoring camera A and the monitoring camera B respectively.

S96, determining a distance and angle calibration curve of the monitoring camera by the server according to the distance and the angle.

In the present disclosure, for each monitoring camera, the server can configured to determine the distance and angle calibration curve of the monitoring camera, according to the distance between all points to be calibrated of all determined monitoring cameras and the monitoring camera, and the angle formed between each point to be calibrated and the monitoring camera and the depth-of-field camera. The distance and angle calibration curve includes two variable parameters of angle and distance, and the distance and angle calibration curve corresponding to each monitoring camera can be obtained by the monitoring camera.

S97, for each target monitoring object and any one monitoring camera in the panoramic sea view, determining an angle formed between the target monitoring object and the any one monitoring camera and the depth-of-field camera by the server.

Specifically, the step of determining an angle formed between the target monitoring object and the any one monitoring camera and the depth-of-field camera, includes:

acquiring a first angle between a current depth-of-field camera and a horizontal line;

acquiring a second angle between the any one monitoring camera and the horizontal line;

determining a deflection angle needed by images of the target monitoring object under a physical deflection angle of the depth-of-field camera; and determining an angle formed between the target monitoring object and the any one monitoring camera and the depth-of-field camera according to the first angle, the second angle and the deflection angle.

In the present disclosure, the depth-of-field camera can rotate according to a preset angular speed to form a physical angle during its rotation, and simultaneously acquire images of the target monitoring object according to a preset frame rate.

Specifically, a first angle Angle(f) between the current depth-of-field camera and the horizontal line can be read by a sensor (such as a level or a gyroscope), furthermore, a second angle Angle(h) between the any one monitoring camera and the horizontal line can also be read by another sensor (such as a level or a gyroscope), Furthermore, a deflection angle Angle(m) needed by images of the target monitoring object under a physical deflection angle of the depth-of-field camera can be calculated by the image mosaic algorithm. In this way, the angle Angle(x) formed between the target monitoring object and the any one monitoring camera and the depth-of-field camera can be determined by the server by the formula as follows: Angle(x)=90−Angle(f)−Angle(h)−Angle(m).

S98, determining a distance between the target monitoring object and the any one monitoring camera by the server, according to the angle formed between the target motoring object and the any one monitoring camera and the depth-of-field camera, and the distance and angle calibration curve of the any one monitoring camera.

In the present disclosure, since the distance and angle calibration curve includes two parameters: the angle and the distance, the server can be configured to substitute the obtained angle formed between the target monitoring object and the any one monitoring camera and the depth-of-field camera into the distance and angle calibration curve of the any one monitoring camera, thereby the distance between the target monitoring object and the any one monitoring camera can be determined.

S99, constructing by the server a three-dimensional scene on the any one monitoring camera by combing the distance between all target monitoring objects and the any one monitoring camera, and attribute information of all the target monitoring objects pre-recorded, based on a two-dimensional scene of the any one monitoring camera.

In the present disclosure, in the process of constructing the two-dimensional scene, the server can be configured to record the attribute information of each target monitoring object, such as orientation information and span information etc.

Figure 11:
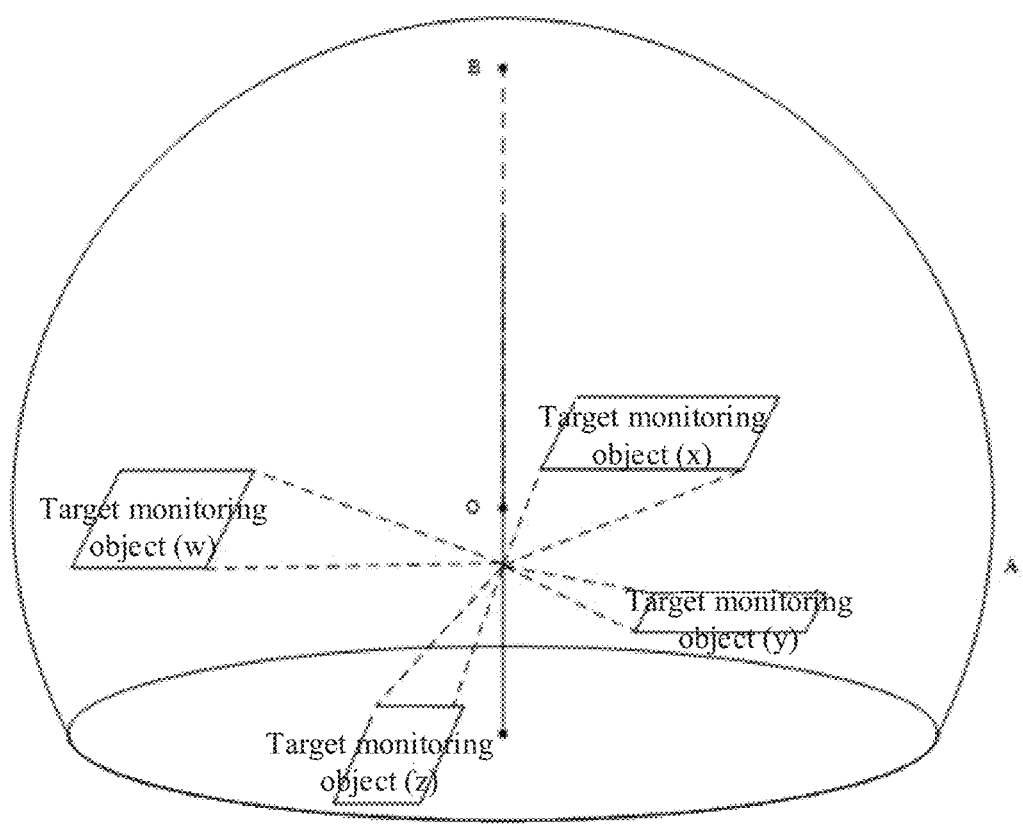
FIG. 11 is a schematic view of a three-dimensional panoramic view disclosed in the present disclosure.

After determining the distance between the target monitoring object and the any one monitoring camera, the server can be configured to construct e three-dimensional scene on the any one monitoring camera by combing the distance between all target monitoring objects and the any one monitoring camera, and the attribute information of all the target monitoring objects pre-recorded, based on a two-dimensional scene of the any one monitoring camera. Referring to FIG. 11, it is a schematic view of a three-dimensional panoramic view disclosed in the present disclosure. As shown in FIG. 11, the three-dimensional panoramic view includes four target monitoring objects, respectively named as target monitoring object (x), target monitoring object (y), target monitoring object (z) and target monitoring object (w). Furthermore, the position of point O is the position of the monitoring camera. Each monitoring camera is configured to monitor the panoramic sea view on its position so as to obtain the three-dimensional panoramic view similar to FIG. 11.

S910, for the any one monitoring camera, mapping by the server the three-dimensional scene constructed on the any one monitoring camera into a uniform three-dimensional coordinate system by coordinate transformation.

In the present disclosure, the three-dimensional scene can be constructed on each monitoring camera with the monitoring camera as the central coordinate origin. Since the coordinate systems of three-dimensional scenes constructed by different monitoring cameras are different, in order to construct a world scene, the server needs to map the three-dimensional scene constructed by the monitoring camera into the uniform three-dimensional coordinate system by coordinate transformation. The uniform three-dimensional coordinate system can be a coordinate system with the earth as the central coordinate origin.

Figure 12:
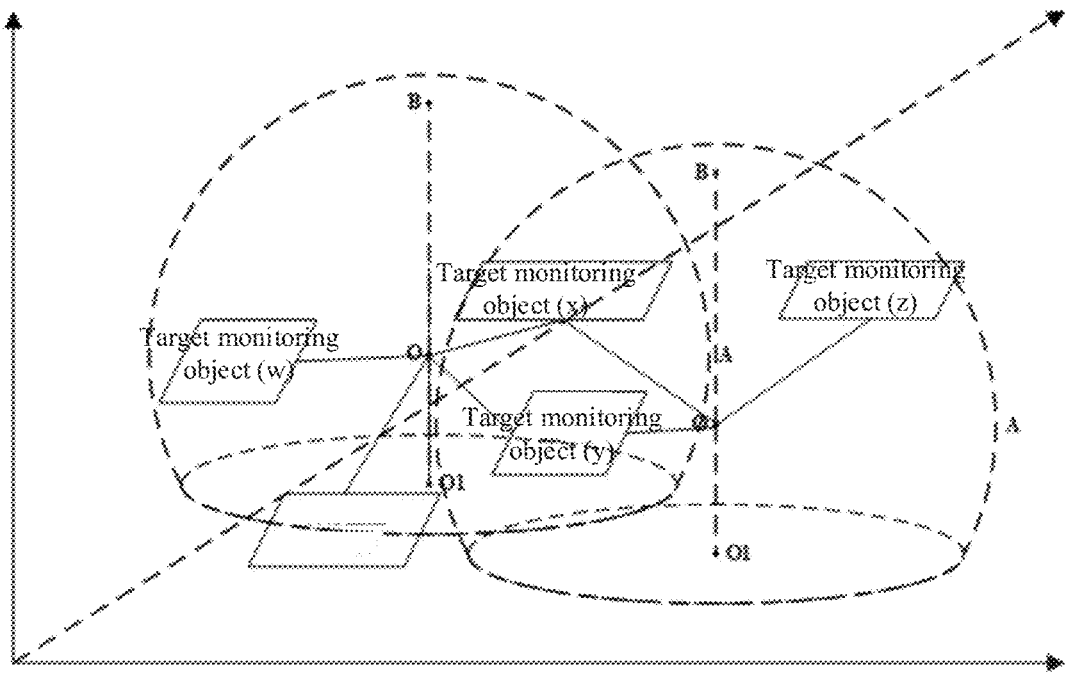
FIG. 12 is a schematic view of coordinate transformation of a target monitoring object disclosed in the present disclosure.

Referring to FIG. 12, it is a schematic view of coordinate transformation of a target monitoring object disclosed in the present disclosure. As shown in FIG. 12, it is shown that the three-dimensional scenes constructed by two monitoring cameras are mapped into the uniform three-dimensional coordinate system. The three-dimensional scene constructed by a first monitoring camera includes four target monitoring objects, respectively named as target monitoring object (x), target monitoring object (y), target monitoring object (z) and target monitoring object (w), while, The three-dimensional scene constructed by a second monitoring camera includes three target monitoring objects, respectively named as the target monitoring object (x), the target monitoring object (y) and target monitoring object (a).

S911, merging all the target monitoring objects in the three-dimensional coordinate system by the server, so as to construct a world scene on the plurality of monitoring cameras.

In the present disclosure, the server can be configured to merge all the target monitoring objects in the three-dimensional coordinate system according to judgment criterion of overlap degree, furthermore, the judgment criterion of overlap degree is that when the overlap degree of one target monitoring object and the other target monitoring object exceeds a preset threshold, they can be merged into the same target monitoring object. As shown in FIG. 12, both the target monitoring object (x) and the target monitoring object (y) are formed in the three-dimensional scene of the two monitoring points, therefore, in the process of merging images, the target monitoring objects (x) in the two three-dimensional scenes can be merged with each other, and the target monitoring objects (v) also can be merged with each other.

All target monitoring objects can be merged by the server repeatedly until the target monitoring objects of all monitoring points are merged in the unified three-dimensional coordinate system; so as to obtain the world scene. In this way, the transformation from a single monitoring node to network of a plurality of monitoring nodes can be realized, and global target detection and tracking information can also be obtained in a large space. At the same time, it can not only realize information fusion and information integration of information/time information/space information of all the target monitoring objects in the whole system, but also realize continuous monitoring of the vast panoramic sea in time and space.

In the panoramic sea view monitoring method as shown in FIG. 9, the three-dimensional scene as well as the world scene can be constructed, thereby it can not only realize information fusion and information integration of information/time information/space information of all target monitoring objects in the whole system but also realize continuous monitoring of the vast panoramic sea in time and space, the merge operation can simultaneously be carried out in advance during constructing scenes, which is of low complexity.

Figure 13:
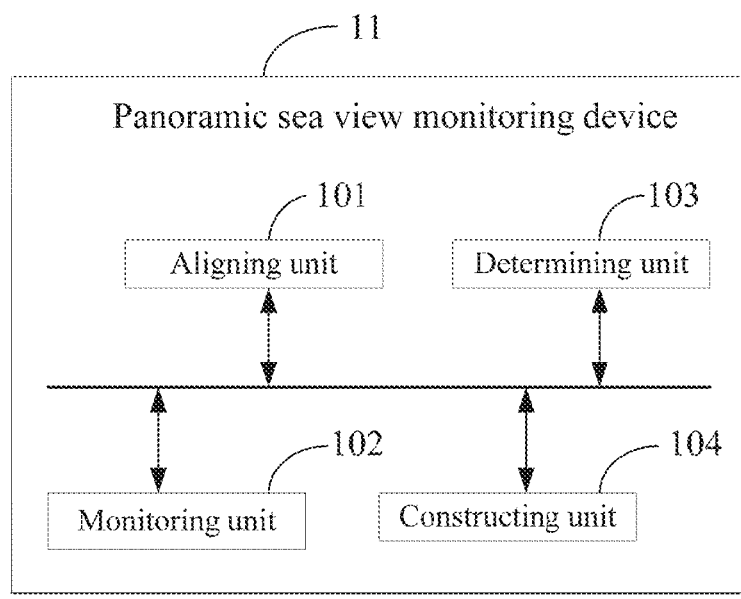
FIG. 13 is a function block of a panoramic sea view monitoring device in accordance with an embodiment disclosed in the present disclosure.

Referring to FIG. 13, it is a function block of the panoramic sea view monitoring device in accordance with an embodiment disclosed in the present disclosure. The panoramic sea view monitoring device shown in FIG. 13 is configured to perform some or all steps of the panoramic sea area monitoring method described in FIG. 3, it can be seen for details from the relevant description in FIG. 3, not repeating it here. Furthermore, a unit described in the present disclosure is a series of computer programs stored in a memory that can be performed by a processor to implement fixed functions. In an embodiment of the present disclosure, the functions of each unit can be subsequently described in details.

An aligning unit 101 is configured to align any two adjacent monitoring cameras among a plurality of monitoring cameras, so that the any two adjacent monitoring cameras are located on the same physical horizontal plane in a field of view.

A monitoring unit 102 is configured to monitor a panoramic sea view by using the plurality of aligned monitoring cameras and a depth-of-field camera, so as to obtain monitoring images.

A determining unit 103 is configured to determine a horizontal spacing parameter and a vertical spacing parameter of the any two adjacent monitoring cameras.

A constructing unit 104 is configured to merge the monitoring images in a pairwise manner by using the horizontal spacing parameter and the vertical spacing parameter, so as to construct a two-dimensional scene.

As shown in FIG. 13, the panoramic sea view monitoring device only needs one depth-of-field camera, which can be combined with the monitoring camera to monitor the panoramic sea view, which can reduce the complexity of the system and reduce the cost thereof. In addition, the two-dimensional scene can be constructed to monitor the panoramic sea view in a more intuitive way.

Figure 14:
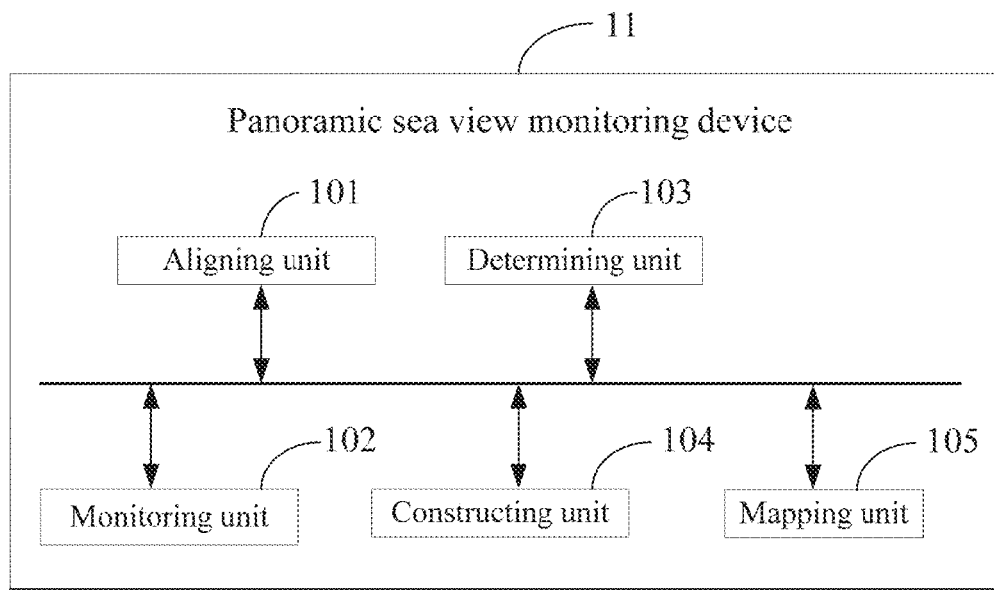
FIG. 14 is a function block of the panoramic sea view monitoring device in accordance with another embodiment disclosed in the present disclosure.

Referring to FIG. 14, it is a function block of the panoramic sea view monitoring device in accordance with another embodiment disclosed in the present disclosure. The panoramic sea view monitoring device shown in FIG. 14 is configured to perform some or all steps of the panoramic sea area monitoring method described in FIG. 9. Furthermore, the panoramic sea area monitoring device shown in FIG. 14 is further optimized on the basis of the panoramic sea area monitoring device shown in FIG. 13, the panoramic sea area monitoring device shown in FIG. 14 further includes a mapping unit 105 relative to the panoramic sea area monitoring device shown in FIG. 13, Furthermore, a unit described in the present disclosure is a series of computer programs stored in a memory that can be performed by a processor to implement fixed functions. In an embodiment of the present disclosure, the functions of each unit can be subsequently described in details.

The determining unit 103 is also configured to, for each monitoring camera, determine a distance between all points to be calibrated of the monitoring camera and the monitoring camera, and determining an angle formed between each point to be calibrated and the monitoring camera and the depth-of-field camera; and the determining unit 103 is also configured to, determine a distance and angle calibration curve of the monitoring camera according to the distance and the angle.

The determining unit 103 is further configured to, for each target monitoring object and any one monitoring camera in the panoramic sea view, determine an angle formed between the target monitoring object and the any one monitoring camera and the depth-of-field camera;

The determining unit 103 is further configured to determine a distance between the target monitoring object and the any one monitoring camera, according to the angle formed between target motoring object and the any one monitoring camera and the depth-of-field camera, and the distance and angle calibration curve of the any one monitoring camera.

The constructing unit 104 is also configured to construct a three-dimensional scene on the any one monitoring camera by combing the distance between all target monitoring objects and the any one monitoring camera, and attribute information of all the target monitoring objects pre-recorded, based on a two-dimensional scene of the any one monitoring camera.

The mapping unit 105 is configured to map the three-dimensional scene constructed on the any one monitoring camera into a uniform three-dimensional coordinate system by coordinate transformation; and The constructing unit 104 is further configured to merge all the target monitoring objects in the three-dimensional coordinate system; so as to construct a world scene on the plurality of monitoring cameras.

The way of determining the angle formed between the target surveillance object and any of the surveillance camera and the depth-of-field camera by the determining unit 103 is specified as follows:

acquiring a first angle between a current depth-of-field camera and a horizontal line;

acquiring a second angle between the any one monitoring camera and the horizontal line;

determining a deflection angle needed by images of the target monitoring object under a physical deflection angle of the depth-of-field camera; and determining an angle formed between the target monitoring object and the any one monitoring camera and the depth-of-field camera according to the first angle, the second angle and the deflection angle.

In the panoramic sea view monitoring device as shown in FIG. 14, the three-dimensional scene as well as the world scene can be constructed, thereby it can not only realize information fusion and information integration of information/time information/space information of all target monitoring objects in the whole system, but also realize continuous monitoring of the vast panoramic sea in time and space, the merge operation is simultaneously carried out in advance during constructing scenes, which is of low complexity.

The integrated unit, implemented in the form of software functional modules, can be stored in a computer readable storage medium. Furthermore, the computer readable storage medium can be configured to store computer programs which are performed by a processor to implement the steps of the method described in the above embodiments. The computer program includes computer program codes which can be shown in source codes, object codes, executable files or some intermediate forms, etc. The computer readable storage medium can include: any, entity or devices with the computer program codes, recording mediums, U disks, mobile hard disks, disks, CDs, computer memories, Read-Only Memories (ROMs), Random Access Memories (RAMs), electronic carrier signals, telecommunication signals and software distribution medias, etc. It should be noted that contents within the computer readable storage medium can be increased or decreased as appropriate as required by the legislation and patent practice in the jurisdiction.

Figure 15:
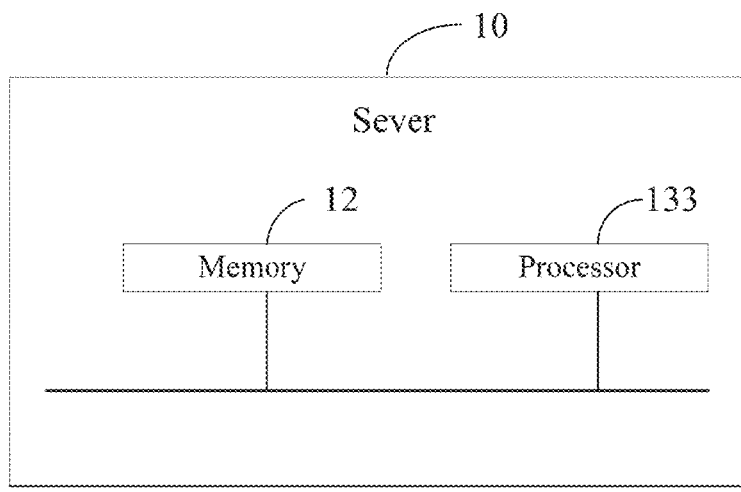
FIG. 15 is a schematic view of a server configured to realize the panoramic sea view monitoring method in accordance with an embodiment disclosed in the present disclosure.

Referring to FIG. 15, it is a schematic view of a server configured to realize the panoramic sea view monitoring method in accordance with an embodiment disclosed in the present disclosure. The server includes a memory 12 and a processor 13. It can be understood for one of ordinary skill in the related art that the diagram shown in FIG. 15 is a merely schema example of the server 10 of the present disclosure, but not intended to limit the protection scope of the server 10, it can include more or less parts than that of being shown in FIG. 15, or a combination of parts, or different parts, for example, the server 10 can also include input/output devices, network access devices, buses etc.

The server 10 further includes, but not limited to, any electronic product for human-computer interaction by means of a keyboard, a mouse, a remote control, a touch pad or a voice control device such as person computers, tablet computers, smart phones, Personal Digital Assistants (PDAs), consoles, Internet Protocol Televisions (IPTVs), smart wearable devices etc. The Network of the server 10 can include, but not limited to, the Internet, wide area Network, metropolitan area Network, local area Network, Virtual Private Network (VPN), etc.

The memory 12 optionally includes one or more computer readable storage mediums for storing programs and various data of the panoramic sea view monitoring method, and further can achieve high-speed and automatic access to programs or data during operating the sever 10. The memory 12 optionally includes a high speed random access memory and also optionally includes a non-volatile memory such as one or more disk storage devices, flash storage devices, or other non-volatile solid-state storage devices.

The processor 13, also known as a CPU (Central Processing Unit), is a very large scale integrated circuit which is the Core of operation and the Control Unit of the server 10. The processor 13 can be configured to perform operation systems of the server 10 and various applications and program codes etc installed therein, such as the panoramic sea view monitoring device 11.

Referring to FIG. 3 and FIG. 9, the memory 12 of the server 10 is configured to store a plurality of instructions to implement the panoramic sea view monitoring method, and the processor 13 is configured to perform the plurality of instructions to implement:

aligning any two adjacent monitoring cameras among a plurality of monitoring cameras, so that the any two adjacent monitoring cameras are located on the same physical horizontal plane in a field of view;

monitoring a panoramic sea view by using the plurality of aligned monitoring cameras and a depth-of-field camera, so as to obtain monitoring images;

determining a horizontal spacing parameter and a vertical spacing parameter of the any two adjacent monitoring cameras; and merging the monitoring images in a pairwise manner by using the horizontal spacing parameter and the vertical spacing parameter, so as to construct a two-dimensional scene.

In an alternative embodiment, the processor 13 can be configured to perform the plurality of instructions to implement:

for each monitoring camera, determining a distance between each point to be calibrated of the monitoring camera and the monitoring camera, and determining an angle formed between each point to be calibrated and the monitoring camera and the depth-of-field camera; and determining a distance and angle calibration curve of the monitoring camera according to the distance and the angle.

In an alternative embodiment, the processor 13 can be configured to perform the plurality of instructions to implement:

for each target monitoring object and any one monitoring camera in the panoramic sea view, determining an angle formed between the target monitoring object and the any one monitoring camera and the depth-of-field camera;

determining a distance between the target monitoring object and the any one monitoring camera, according to the angle formed between the target motoring object and the any, one monitoring camera and the depth-of-field camera, and the distance and angle calibration curve of the any one monitoring camera; and constructing a three-dimensional scene on the any one monitoring camera by combing the distance between all target monitoring objects and the any one monitoring camera, and attribute information of all the target monitoring objects pre-recorded, based on a two-dimensional scene of the any one monitoring camera.

In an alternative embodiment, the processor 13 can be configured to perform the plurality of instructions to implement:

for the any one monitoring camera, mapping the three-dimensional scene constructed on the any one monitoring camera into a uniform three-dimensional coordinate system by coordinate transformation; and merging all the target monitoring objects in the three-dimensional coordinate system, so as to construct a world scene on the plurality of monitoring cameras.

In an alternative embodiment, determining the angle formed between the target monitoring object and the any one monitoring camera and the depth-of-field camera, includes:

acquiring a first angle between a current depth-of-field camera and a horizontal line;

acquiring a second angle between the any one monitoring camera and the horizontal line;

determining a deflection angle needed by images of the target monitoring object under a physical deflection angle of the depth-of-field camera; and determining an angle formed between the target monitoring object and the any one monitoring camera and the depth-of-field camera according to the first angle, the second angle and the deflection angle.

Specifically, a specific implementation method of the above instructions performed by the processor 13 can be seen from the description of the relevant steps in corresponding embodiments shown in FIG. 3 or FIG. 9, not repeating it here.

The server described in FIG. 15, is configured to align any two adjacent monitoring cameras among the plurality of monitoring cameras, so that the any two adjacent monitoring cameras are located on the same physical horizontal plane in a field of view; furthermore, the server is configured to monitor a panoramic sea view by using the plurality of aligned monitoring cameras and a depth-of-field camera, so as to obtain monitoring images; and determine a horizontal spacing parameter and a vertical spacing parameter of the any two adjacent monitoring cameras; and furthermore, the server is then configured to merge the monitoring images in a pairwise manner by using the horizontal spacing parameter and the vertical spacing parameter, so as to construct a two-dimensional scene. It can be seen that in the present disclosure, the panoramic sea view monitoring system only needs one depth-of-field camera, which can be combined with the monitoring camera to monitor the panoramic sea view, which can reduce the complexity of the system and reduce the cost thereof. In addition, the two-dimensional scene can be constructed to monitor the panoramic sea view in a more intuitive way.

In some embodiments of the present disclosure, it can be understood that the disclosed systems, devices and methods can be implemented by other ways. For example, the device of the embodiment described above is only a schematic description, for example, the partition of the modules is only a logical function partition, which can be implemented by another way.

The modules described as separation parts can or can't be physically separated, and the parts displayed as modules can or can't be physical units, that is, they can be located in one place, or can be distributed on a plurality of network units. Some or all of the modules can be selected according to actual needs to implement the purpose of the present disclosure.

In addition, the functional modules in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

It is obvious to one of ordinary skill in the related art that the present disclosure is not limited to the details of the above embodiments, and the present disclosure can be implemented in other concrete forms without debyting from the spirit or basic characteristics of the present disclosure. The foregoing descriptions are merely embodiments of the present disclosure, but not intended to limit the protection scope of the present disclosure, the scope of the present disclosure shall be subject to be appended claims rather than be the foregoing description. Accordingly, this specification and accompanying drawings are only exemplary descriptions of the present disclosure as defined by the claims and are deemed to cover any and all modifications, variations, combinations or equivalents within the scope of the present disclosure. Furthermore, it is obvious that the terms "include", "includes", "including" don't exclude other units or steps, and the singular does not exclude the plural. The multiple units or devices described in the system claims can also be implemented by a unit or a device through software or hardware. The meaning of the term "second" shown in the specification is only used to indicate names of elements of the present disclosure, but not indicated that the elements of the present disclosure is shown in any particular order, important or represented the amount of the elements.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A panoramic sea view monitoring method comprising:
aligning any two adjacent monitoring cameras among a plurality of monitoring cameras, so that the any two adjacent monitoring cameras are located on the same physical horizontal plane in a field of view;
monitoring a panoramic sea view by using the plurality of aligned monitoring cameras and a depth-of-field camera, so as to obtain monitoring images;
determining a horizontal spacing parameter and a vertical spacing parameter of the any two adjacent monitoring cameras; and
merging the monitoring images in a pairwise manner by using the horizontal spacing parameter and the vertical spacing parameter, so as to construct a two-dimensional scene; and wherein for each monitoring camera, determining a distance between each point to be, calibrated of the monitoring camera and the monitoring camera, and determining an angle formed between each point to be calibrated and the monitoring camera and the depth-of-field camera, wherein each monitoring camera comprises a plurality of points to be calibrated; and determining a distance and angle calibration curve of the monitoring camera according to the distance and the angle.

2. The panoramic sea view monitoring method as claimed in claim 1, wherein the method further comprises:

for each target monitoring object and any one monitoring camera in the panoramic sea view, determining an angle formed between the target monitoring object and the any one monitoring camera and the depth-of-field camera;

determining a distance between the target monitoring object and the any one monitoring camera, according to the angle formed between the target motoring object and the any one monitoring camera and the depth-of-field camera, and a distance and angle calibration curve of the any one monitoring camera; and constructing a three-dimensional scene on the any one monitoring camera by combing the distance between all target monitoring objects and the any one monitoring camera, and attribute information of all the target monitoring objects pre-recorded, based on a two-dimensional scene of the any one monitoring camera.

3. The panoramic sea view monitoring method as claimed in claim 2, wherein the method further comprises:

for the any one monitoring camera, mapping the three-dimensional scene constructed on the any one monitoring camera into a uniform three-dimensional coordinate system by coordinate transformation; and merging all the target monitoring objects in the three-dimensional coordinate system, so as to construct a world scene on the plurality of monitoring cameras.

4. The panoramic sea view monitoring method as claimed in claim 2, wherein the step of determining an angle formed between the target monitoring object and the any one monitoring camera and the depth-of-field camera, comprises:

acquiring a first angle between a current depth-of-field camera and a horizontal line;

acquiring a second angle between the any one monitoring camera and the horizontal line;

determining a deflection angle needed by images of the target monitoring object under a physical deflection angle of the depth-of-field camera; and determining an angle formed between the target monitoring object and the any one monitoring camera and the depth-of-field camera according to the first angle, the second angle and the deflection angle.

5. A server comprising:

a memory configured to store at least one instruction therein; and a processor configured to perform the at least one instruction to implement;

aligning any two adjacent monitoring cameras among a plurality of monitoring cameras, so that the any two adjacent monitoring cameras are located on the same physical horizontal plane in a field of view;

monitoring a panoramic sea view by using the plurality of aligned monitoring cameras and a depth-of-field camera, so as to obtain monitoring images;

determining a horizontal spacing parameter and a vertical spacing parameter of the any two adjacent monitoring cameras;

merging the monitoring images in a pairwise manner by using the horizontal spacing parameter and the vertical spacing parameter, so as to construct a two-dimensional scene;

for each monitoring camera, determining a distance between each point to be calibrated of the monitoring camera and the monitoring camera, and determining an angle formed between each point to be calibrated and the monitoring camera and the depth-of-field camera, wherein each monitoring camera comprises a plurality of points to be calibrated; and determining a distance and angle calibration curve of the monitoring camera according to the distance and the angle.

6. A panoramic sea view monitoring system comprising:

a plurality of monitoring cameras configured to monitor a panoramic sea view in a two-dimensional space;

a depth-of-field camera configured to collect distance information associated with target monitoring objects in a three-dimensional space, based on monitoring by the plurality of monitoring cameras in the two-dimensional space; and a server configured to implement:

aligning any two adjacent monitoring cameras among the plurality of monitoring cameras, so that the any two adjacent monitoring cameras are located on the same physical horizontal plane in a field of view;

monitoring a panoramic sea view by using the plurality of aligned monitoring cameras and the depth-of-field camera, so as to obtain monitoring images;

determining a horizontal spacing parameter and a vertical spacing parameter of the any two adjacent monitoring cameras;

merging the monitoring images in a pairwise manner by using the horizontal spacing parameter and the vertical spacing parameter, so as to construct a two-dimensional scene;

for each monitoring camera, determining a distance between each point to be calibrated of the monitoring camera and the monitoring camera, and determining an angle formed between each point to be calibrated and the monitoring camera and the depth-of-field camera, wherein each monitoring camera comprises a plurality of points to be calibrated; and determining a distance and angle calibration curve of the monitoring camera according to the distance and the angle.

* * * * *